United States Patent
Basstein

[19]

[11] Patent Number: 5,931,612
[45] Date of Patent: Aug. 3, 1999

[54] HOB CUTTER FOR MACHINING FACE GEARS, AND METHOD FOR MANUFACTURING SUCH A TOOL

[75] Inventor: Augustinus F. H. Basstein, Delden, Netherlands

[73] Assignee: Crown Gear, B.V., Netherlands

[21] Appl. No.: 08/870,607

[22] Filed: Jun. 6, 1997

Related U.S. Application Data

[63] Continuation of application No. PCT/NL95/00413, Dec. 7, 1995.

[30] Foreign Application Priority Data

Dec. 7, 1994 [NL] Netherlands ............................ 9402055

[51] Int. Cl.$^6$ ........................................................ B24B 3/12
[52] U.S. Cl. ................................................ 407/12; 407/26
[58] Field of Search ................................. 407/20, 23, 24, 407/26, 27, 28; 409/11, 12, 13

[56] References Cited

U.S. PATENT DOCUMENTS

| | | | |
|---|---|---|---|
| 1,548,930 | 8/1925 | Candee | 407/26 |
| 1,795,093 | 3/1931 | Olson | 407/24 |
| 1,829,292 | 10/1931 | Olson | 407/26 |
| 1,873,158 | 8/1932 | Simmons | 407/26 |
| 2,304,586 | 11/1942 | Miller | 407/23 |
| 4,202,222 | 5/1980 | Ainoura . | |
| 4,309,926 | 1/1982 | Ainoura . | |
| 5,033,239 | 7/1991 | Phillips | 409/11 |
| 5,494,475 | 2/1996 | Basstein | 407/28 |
| 5,791,840 | 8/1998 | Sijtstra | 409/12 |

FOREIGN PATENT DOCUMENTS

| | | |
|---|---|---|
| 744 724 | 1/1944 | Germany . |
| 28 26 911 | 12/1978 | Germany . |
| 28 27 145 A1 | 4/1979 | Germany . |
| 8901745 | 2/1991 | Netherlands . |
| WO 91/048 | 4/1991 | WIPO . |
| WO 92/09395 | 6/1992 | WIPO . |
| WO 94/17945 | 8/1994 | WIPO . |

*Primary Examiner*—Andrea L. Pitts
*Assistant Examiner*—Mark Williams
*Attorney, Agent, or Firm*—Deveau, Colton & Marquis

[57] ABSTRACT

A hob cutter (4) for machining face or crown gears comprises a disc-like cutter body having an axis of rotation (6) and a number of hob teeth groups (1, 2, 3, . . . ) which are uniformly distributed over the circumference and which are each bounded at the front by a cutting face (S) and at the cirumferential side by a clearance face (V). The cutting face and the clearance face of each hob teeth group intersect one another in a cutting edge (9) which determines the shape of the face gear to be machined. The clearance face of each hob teeth group is made up of a number of generatrices (L, m) which are each situated in a machining plane which is determined by a line which intersects or crosses the axis of rotation (6) perpendicularly and intersects the generatrix at the position of the cutting edge. The extensions of the generatrices (L, m) determining the clearance face run at a minium spacing over the outside of the downstream hob teeth group.

5 Claims, 6 Drawing Sheets

HOB CUTTER FOR MACHINING FACE GEARS, AND METHOD FOR MANUFACTURING SUCH A TOOL

This is a continuation of co-pending International Application PCT/NL95/00413 filed Dec. 7, 1995.

FIELD OF THE INVENTION

The invention relates to a hob cutter and more specifically to a hob cutter for a machining face gears having a disc-like cutter body and a number hob teeth groups.

DESCRIPTION OF THE RELATED ART

Such a hob cutter is disclosed, for example, in EP-A-0 494 221. In a particular embodiment of said hob cutter, the metal-removing elements are separate blades which are fitted in a cutter body. The position of the cutting edges with respect to one another and with respect to the axis of rotation can be brought about with sufficient accuracy only with great difficulty and at high costs. In another embodiment of said hob cutter, the metal-removing elements are hob teeth groups which are integral with the rest of the cutter. In the abovementioned publication, how the clearance faces are machined to the required accuracy is not elaborated for this embodiment.

EP-A-0 559 798 describes a method for manufacturing a hob cutter for machining face gears. In this case, the clearance faces are machined when the hob teeth groups have a fixed position with respect to one another and the axis of rotation either by fitting the separate blades before the final machining or by making the tool from a single piece of material. The machining of the clearance faces is the most expensive and complicated machining since the clearance faces have an irregularly shaped surface whose accuracy determines the quality of the cutter. In this known method, the clearance faces are ground by an abrasive wheel which moves over the surface and machines the clearance faces point by point. This lengthy machining requires expensive special processing machines of limited availability, as a result of which the machining of the hob cutters is expensive and the delivery times are long.

The object of the invention is to provide a hobbing tool having a shape which is such that the machining of the clearance faces can be performed with simple machines.

According to the invention, this object is achieved by a hob cutter having the characteristics of claim 1.

By designing the hob cutter in such a way that the machining of each hob teeth group placed in the cutter is able to take place along mutually parallel lines and independently of the hob teeth groups placed alongside, it is possible to use generally obtainable processing machines, as a result of which the cost price and delivery time of the cutter can be improved without its accuracy decreasing.

The invention also relates to a method for manufacturing the bob cutter according to the invention.

By always machining the clearance faces of the bob cutter for each bob teeth group in one plane, a simple processing machine can be chosen and the result is achieved that the machining times are as short as possible.

BRIEF DESCRIPTION OF THE FIGURES

The invention will now be explained in the example of embodiment below by reference to a drawing.

DETAILED DESCRIPTION OF A PREFERRED EMBODIMENT

Figure 1:
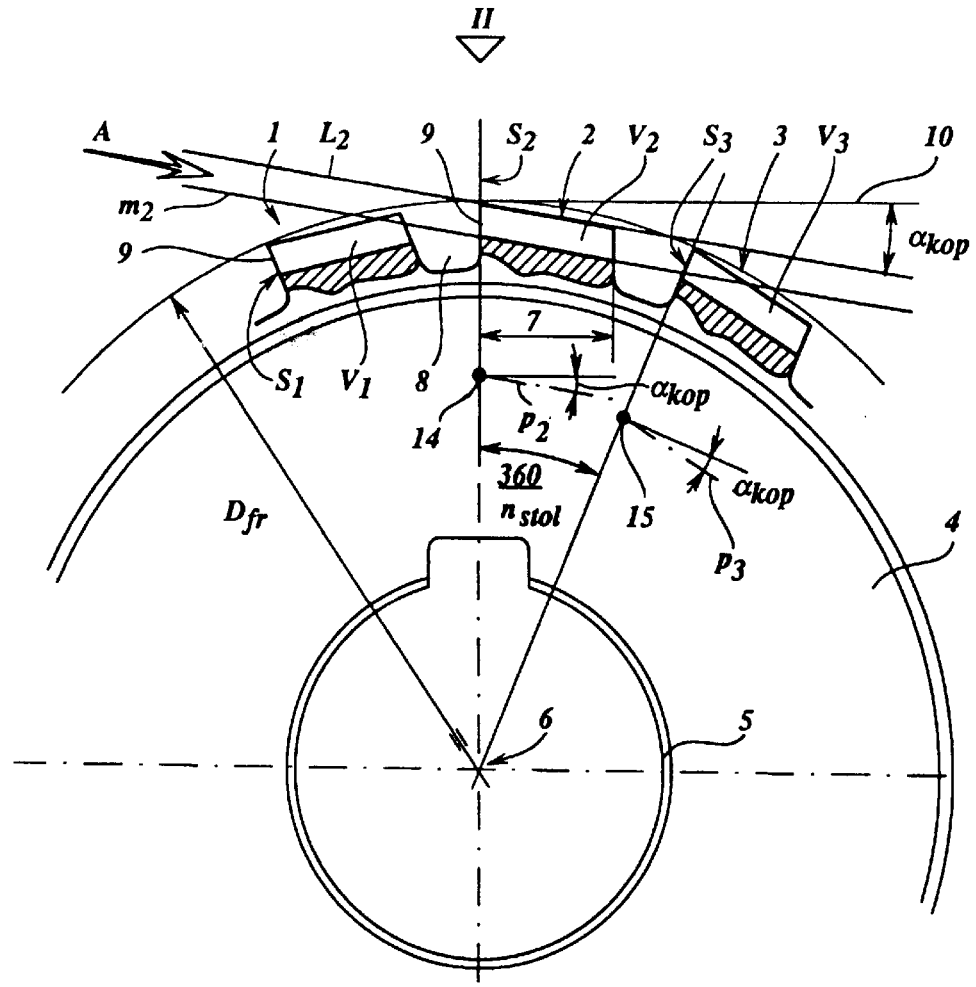
FIG. 1 shows a side view of a hob cutter for machining face gears according to the invention, provided with hob teeth groups whose clearance faces are formed by straight generatrices which run parallel to one another.
Figure 2:
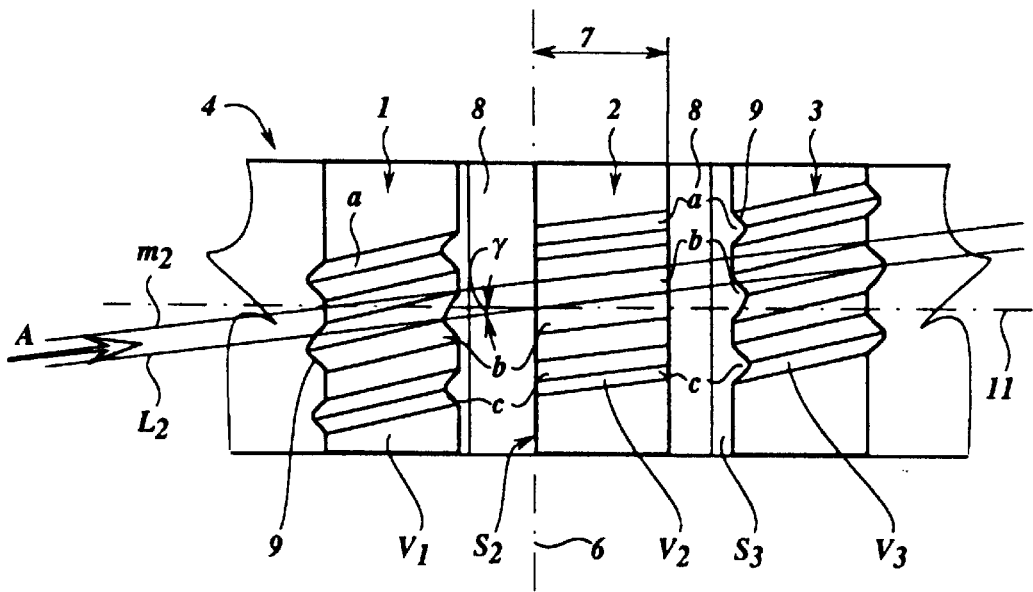
FIG. 2 shows a bob cutter according to FIG. 1 viewed in the direction of arrow II.

FIGS. 1 and 2 show a hob cutter 4 with which face gears can be machined. Said hob cutter 4 comprises a disc-like body which is provided with a number $n_{stol}$ of hob teeth groups which are distributed uniformly over the circumference of the cutter. FIGS. 1 and 2 show the hob teeth groups 1, 2 and 3. Each hob teeth group is provided with a cutting face S and a clearance face V, the line of intersection of the cutting face S and the clearance face V forming a cutting edge 9 whose shape corresponds to a desired profile which will be described below in still greater detail and which determines the shape of the workpiece machined by the hob cutter 4. Since the number of hob teeth groups is $n_{stol}$, the angle between the consecutive cutting faces S is $360°/n_{stol}$.

The hob cutter 4 has an external diameter $D_{fr}$, a bore and an axis of rotation 6, which is also the centre line of the bore 5. The hob teeth groups having a teeth group length 7 are separated by a gash 8 whose direction corresponds to the direction of the axis of rotation 6 of the hob cutter 4. The teeth group length 7 is limited as a result of the fact that it is necessary to prevent the rear of the hob teeth group coming into contact with the workpiece during the machining.

The clearance face V of each hob teeth group is formed by a set of parallel generatrices. All these lines run in a direction A, a first line L forming, for example, the highest point and a second line m forming the lowest point of the clearance face V.

A machining plane which is not shown in the drawing and in which both a generatrix, intersecting the cutting edge 9, of the clearance face V and a line which is perpendicular to the axis of rotation 6 and which intersects the generatrix at the position of the cutting edge are situated makes a lead angle γ with a second plane or central plane 11 which is perpendicular to the axis of rotation 6 and passes through the centre of the tool. In the machining plane, the generatrix situated in said plane makes, at the position of the cutting edge 9, a clearance angle $\alpha_{kop}$ with a line 10 which is directed towards a downstream hob teeth group and which is perpendicular to a radius vector running from the cutting edge 9 to the axis of rotation 6 of the hob cutter 4.

The profile of the cutting edge 9 is shaped in a known manner in such a way that the hob cutter 4 can be used to manufacture face gears which are able to interact with cylindrical pinions, which may be provided with straight or helical toothing.

The profile of each cutting edge 9 is derived from the cylindrical pinion which determines the shape of the face gear, the profile being adjusted with necessary corrections, for example for the case where the radius vector to the axis of rotation 6 is not situated in the cutting face S or the hobbing tool is made suitable for machining face gears which can interact with a helically toothed pinion.

A line $p_2$ intersects the cutting face $S_2$ at the position of a central point 14 of the cutting edge 9 of the hob teeth group 2, which central point 14 corresponds to the central point of the pinion which interacts with the face gear. The line $p_2$ makes an angle $\alpha_{kop}$ with the line which is perpendicular to the radius vector to the axis of rotation 6 and therefore runs parallel to the clearance face V. A line $p_3$ corresponds to the line $p_2$ but intersects the cutting face $S_3$ at the position of a central point 15 of the cutting edge 9 of the hob teeth group 3.

As a departure from the exemplary embodiment shown in FIG. 2, it is also possible, for example in cases where the lip angle γ is given a high value, for the cutting face S not to be perpendicular to the central plane 11 but to be, for example, perpendicular to the direction A. This can have the result that the cutting face becomes helical in a known manner, as is discussed in greater detail below by reference to FIGS. 9, 10 and 11.

As will be clear, the shape of the cutting edge 9 remains the same after grinding the cutting face S if the ground cutting face runs parallel to the old cutting face. Since the axis of rotation 6 is then no longer situated in the cutting face S, the shape of the face gear made with the hobbing tool alters and acquires deviations from the theoretically correct shape. If the cutting face S is ground in such a way that the axis of rotation 6 forms a part thereof, the shape of the cutting edge 9 alters. The deviation is reduced by optimizing the direction in which the cutting face S is ground.

Depending, inter alia, on the shape of the desired profile of the cutting edge 9, the number of teeth groups $n_{stol}$, the clearance angle $\alpha_{kop}$ and the diameter $D_{fr}$, the generatrices of the clearance face of the hob teeth group 2, such as, for example, the first line $L_2$ and the second line $m_2$, may intersect the downstream hob teeth group 3. If the clearance faces V of the hob cutter 4 are then machined with a tool which machines according to an appropriate straight generatrix, such as is the case, for example, with wire spark erosion of the clearance faces, then both hob teeth groups 2 and 3 are machined simultaneously. This is undesirable because the accuracy of the final machining is disadvantageously influenced thereby or because the cutting edge 9 of the downstream hob teeth group is partly removed.

Figure 3:
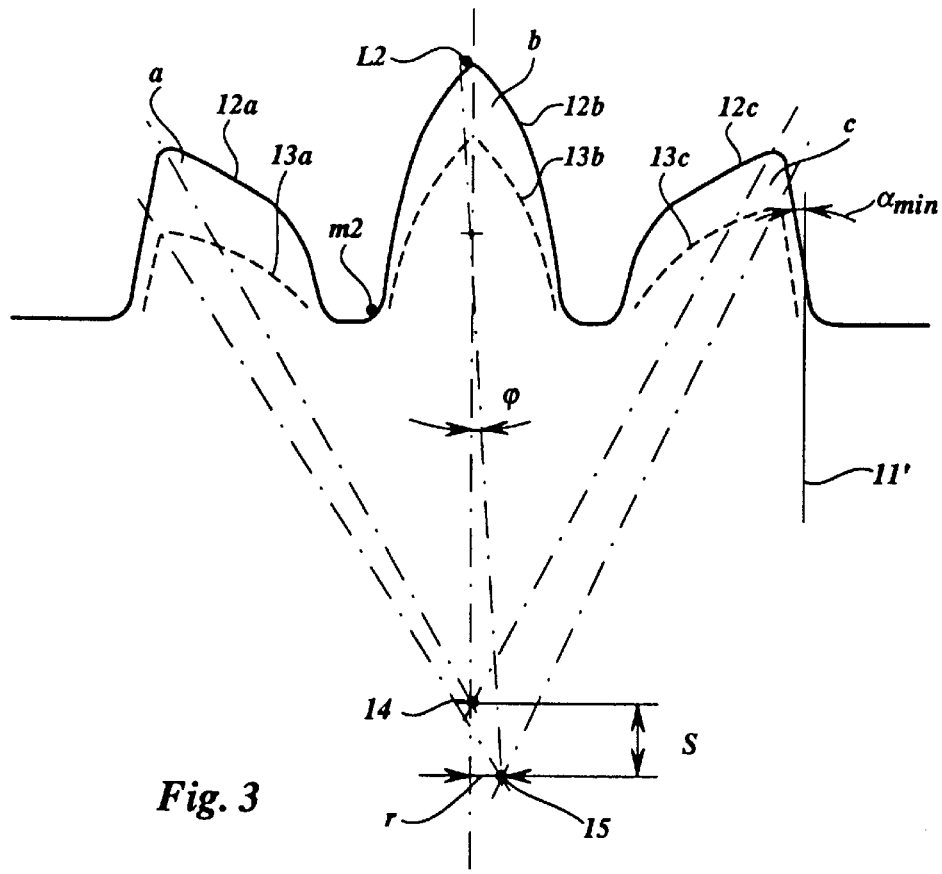
FIG. 3 shows a view of the centre hob teeth group shown of the hob cutter of FIGS. 1 and 2 in the direction of the arrow A.
Figure 4:
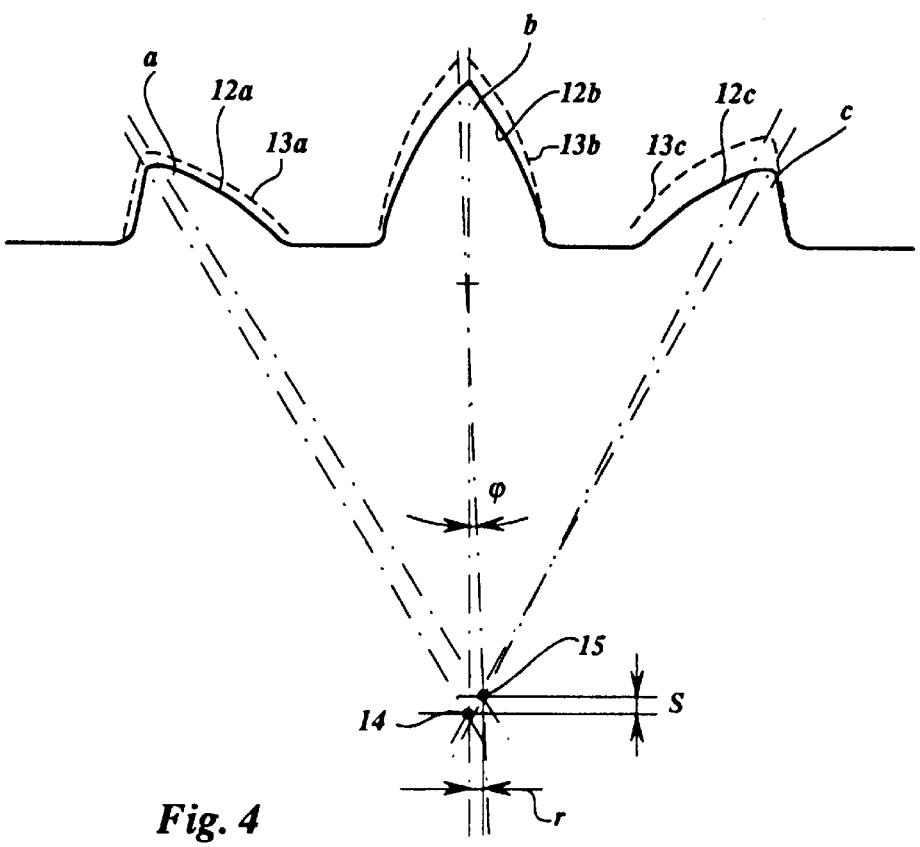
FIG. 4 shows a view in accordance with FIG. 3 of an undesirable embodiment.

FIGS. 3 and 4 explain how this undesirable situation arises and how it can be prevented.

FIG. 3 shows the view A of hob teeth group 2 from FIG. 1, a continuous line 12 corresponding to the cutting edge 9 of the hob teeth group 2 and a broken line 13 corresponding to the cutting edge 9 of the downstream hob teeth group 3.

The profile comprising the teeth a, b and c of the hob teeth group 3 is derived from the same pinion as that from which the profile of the hob teeth group 2 is derived. Under these circumstances, the pinion is always rotated by an angle φ about its central point during the transition between the consecutive teeth groups, the magnitude of φ being such that, for every complete rotation of the hob cutter 4 about its axis of rotation 6, the pinion is rotated by one tooth (in the case of a single-thread cutter) or by a plurality of teeth (in the case of a multithread cutter).

In FIG. 3, hob teeth group 2 is shown in viewing direction A, and the teeth a, b and c of the hob teeth group 3 lying in another plane situated downstream are both rotated and displaced in said viewing direction with respect to those of hob teeth group 2. This displacement is dependent on the number of teeth groups $n_{stol}$ and the diameter of the cutter $D_{fr}$. An apparent horizontal displacement r due to the viewing direction is, in addition, dependent on the lead angle γ and an apparent vertical displacement s due to the viewing direction is dependent on the clearance angle $\alpha_{kop}$.

In the situation shown in FIG. 3, the generatrices which are perpendicular to the plane of the drawing and which together form the clearance face V, including, for example, also the lines $L_2$ and $m_2$, remain outside the downstream hob teeth group 3 indicated by the broken line 13.

The cutting edge 9 is preferably so designed that the teeth become increasingly wider towards the centre of the cutter. This is achieved by ensuring in a known manner that a minimum pressure angle $\alpha_{min}$ between the cutting edge 9 and a plane 11' which is perpendicular to the axis of rotation 6 (not shown in FIG. 3) does not become less than a certain value. Because the root of the tooth has a large width, there is more play with the teeth on the subsequent hob teeth group in the critical region at the root of the teeth a, b and c.

FIG. 4 shows a view corresponding to FIG. 3 in which an undesirable situation has arisen as a result of the fact that, for example, the diameter $D_{fr}$ of the cutter has been made unduly small, as a result of the fact that the number of hob teeth groups $n_{stol}$ is too great or as a result of the fact that the clearance angle $\alpha_{kop}$ is too large. The view in the direction of the generatrices of the clearance face reveals that the downstream hob teeth group projects through the clearance face extended in the direction of the generatrices.

Figure 5:
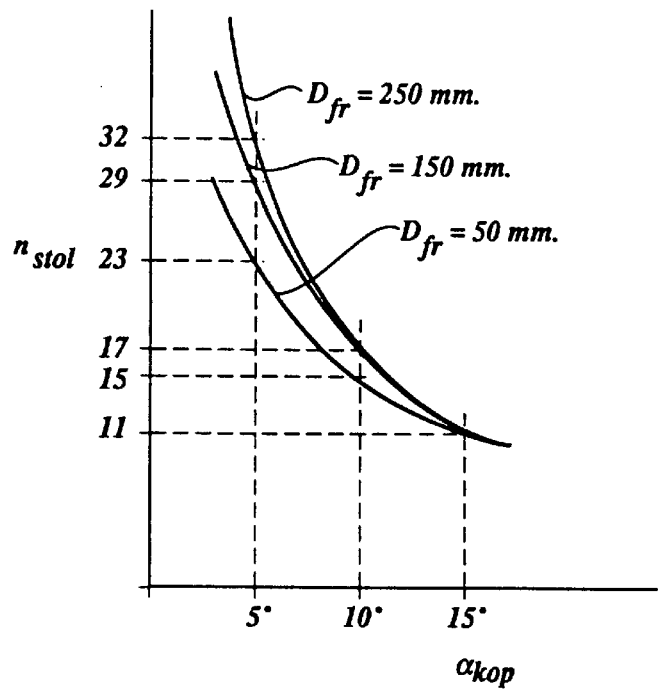
FIG. 5 shows a graph in which the maximum permissible number of hob teeth groups is shown as a function of the cutter diameter and the clearance angle.

FIG. 5 shows in a graph for a certain profile the influence of the diameter $D_{fr}$, the clearance angle $\alpha_{kop}$ and the number $n_{stol}$ of hob teeth groups, the minimum pressure angle $\alpha_{min}$ being 15°, the number of teeth of the pinion interacting with the face gear being 12 and the module of the pinion m being 3 mm. The lines drawn in the graph give the maximum permissible number of teeth groups in a single-thread cutter, the generatrices of the clearance face, which always remain free of the downstream hob teeth group being straight.

Figure 6:
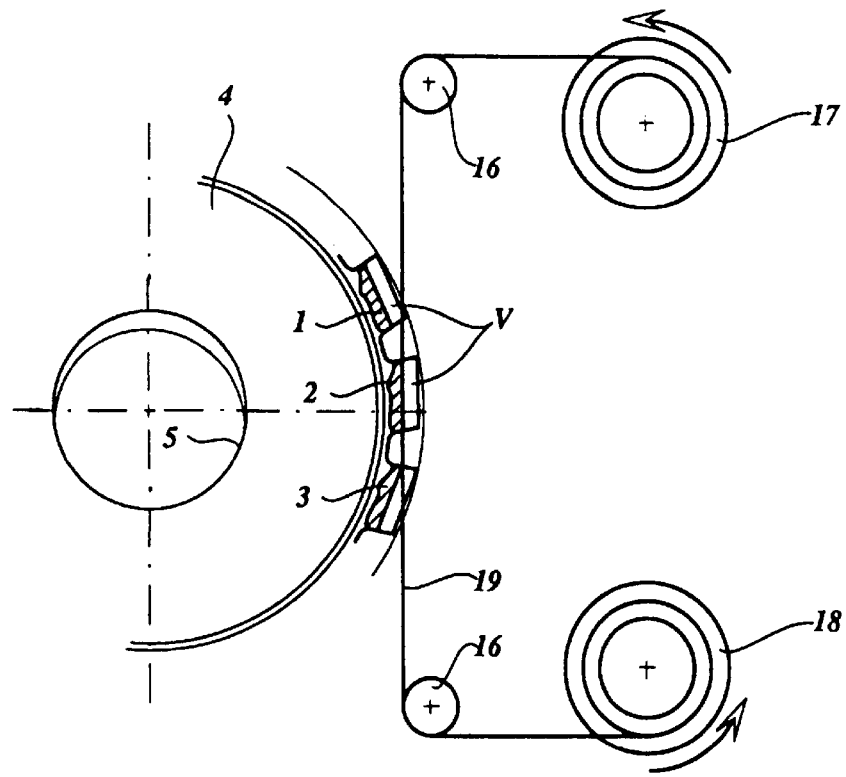
FIG. 6 shows the machining of the clearance face of the bob teeth group of the hob cutter of FIG. 1 by means of wire spark erosion.

FIG. 6 shows the machining of the clearance face V by means of wire spark erosion. In this arrangement, the hob cutter 4 is placed at the lead angle γ on a bed, which is not shown and which is moved with respect to a spark-erosion wire 19, the material of the hob cutter 4 being removed in a known manner by means of spark-erosion metal removal. During the spark erosion, the spark-erosion wire 19 runs over guide rollers 16 from a reel 17 to a reel 18.

Correct dimensioning ensures that always only one hob teeth group is machined during the final machining and that the spark-erosion wire 19 always maintains adequate spacing, for example at least 0.03 mm, from the subsequent hob teeth group 3 during the machining of, for example, hob teeth group 2. As a result of this, the spark-erosion wire 19 is uniformly loaded and a high accuracy and quality of the surface are achieved.

Figure 7:
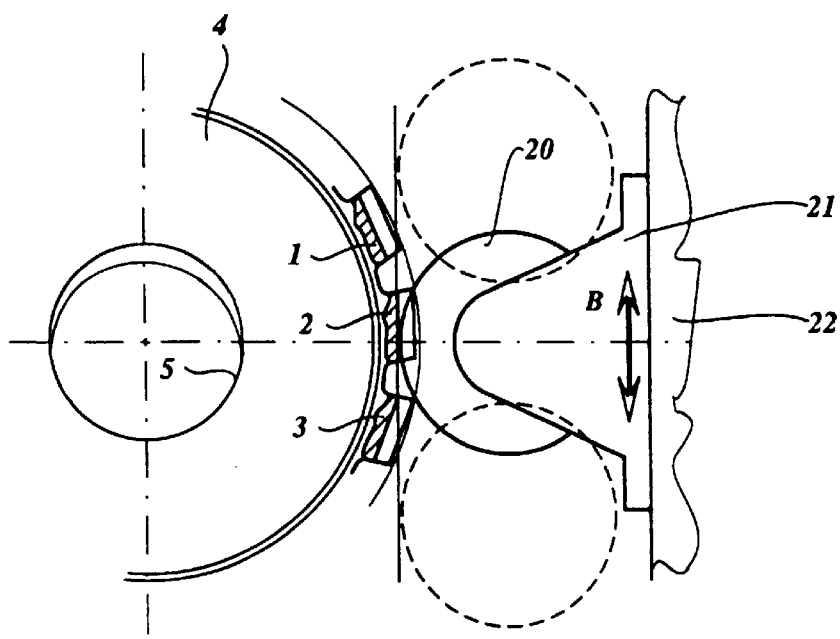
FIG. 7 shows the machining of the clearance face of the hob teeth group of the bob cutter of FIG. 1 by means of grinding.

FIG. 7 shows a final machining of the hob cutter 4 in which the clearance face V is machined by a relatively small abrasive wheel 20. The abrasive wheel 20 is mounted in a carriage 21 which moves to and fro in a direction B along a frame 22. The hob cutter 4, which is placed at the lead angle γ with respect to the direction of movement B of the abrasive wheel, is moved with respect to the frame 22 in such a way that the rectilinear track of the metal-removing surface of the abrasive wheel 20 is moved in accordance with the generatrices along the clearance face V of the hob teeth groups and, as a result, grinds the desired profile in the teeth group.

Figure 8:
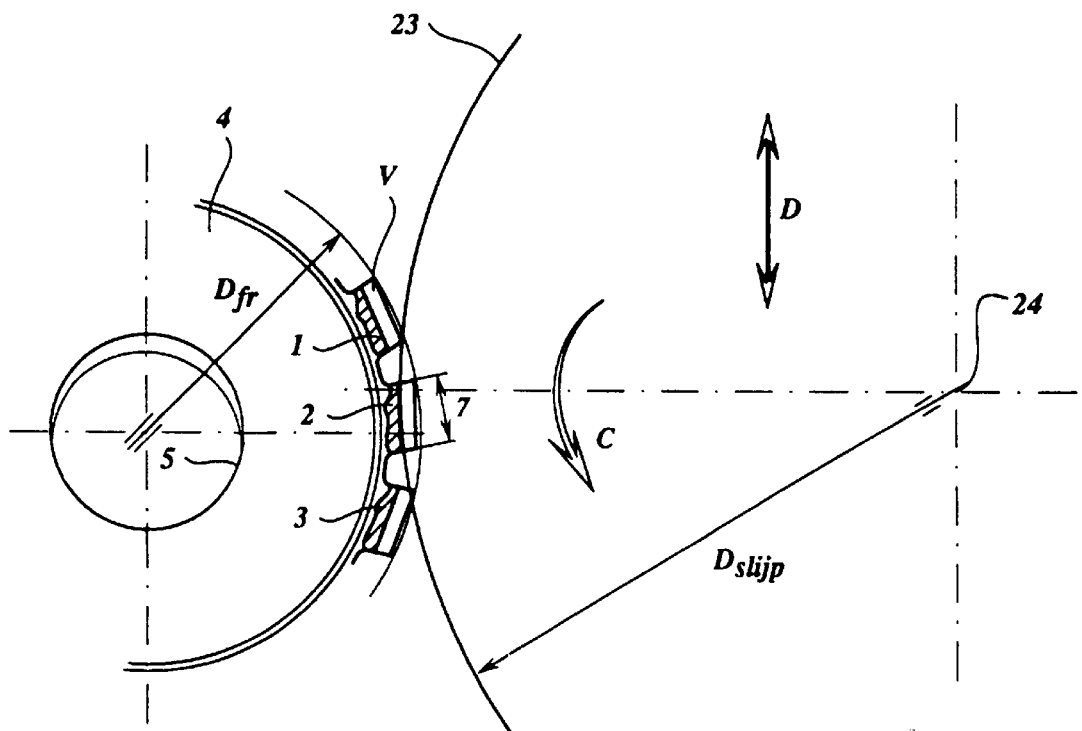
FIG. 8 shows the machining of the clearance face of. the hob teeth group of a hob cutter comparable with that of FIG. 1 by means of an abrasive wheel having large diameter.

FIG. 8 shows a final machining of the hob cutter 4 in which the clearance face V is machined by a large abrasive wheel 23 having an axis of rotation 24 and a diameter $D_{slijp}$ which is substantially greater than the diameter $D_{fr}$ of the hob cutter 4. The larger diameter of the abrasive wheel makes a high grinding speed C possible and the machining process can be relatively fast. In this machining procedure, the central point 24 can be moved in a direction D which corresponds to the direction of the generatrices, as a result of which the generatrices of the clearance face V are straight.

In another procedure for machining the hob cutter 4, the central point 24 is stationary in the direction D. As a result of the fact that the diameter $D_{slijp}$ of the abrasive wheel 23 is large, the straight line of the generatrix is approximated. As a result of the fact that the machining time is shorter due to the lack of the oscillating movement in the direction D, the hob cutter 4 can be cheaper. It is also possible to provide a plurality of hob teeth groups on a cutter of the same diameter, which may increase the metal-removing capacity of the cutter.

Obviously, the machining operations with the abrasive wheels have to be performed with grinding materials whose diameter is more or less constant during the machining of the entire hob cutter or there must be a provision in the processing machine for automatic correction. Preferably, use is made in this connection of diamond-impregnated steel abrasive wheels.

Figure 9:
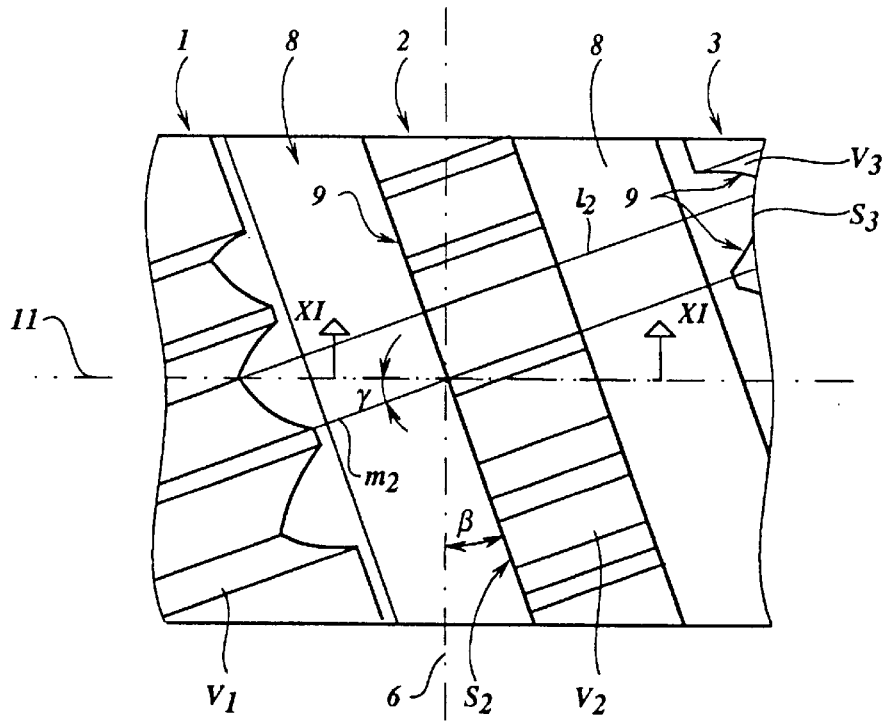
FIG. 9 shows a view, corresponding to FIG. 2, of a hob cutter according to the invention, having a cutting face which is a flat surface and which makes an angle with the axis of rotation of the hob cutter.

FIG. 9 shows the view of a hob cutter which corresponds to FIG. 2 and in which the cutting face S is designed as a flat face which, at the position of the centre plane, makes a slope angle β with the axis of rotation 6 of the hob cutter. The radius vector from the cutting edge 9 to the axis of rotation 6 is situated only in the plane 11 in the cutting face S. It follows from this that the lead angle γ, which is formed by the angle between the plane including the radius vector from the cutting edge 9 to the axis of rotation 6 and the generatrices L and m, is not constant. For smaller values of the slope angle β, any deviations which occur do not, however, give rise to large deviations and are acceptable.

Figure 10:
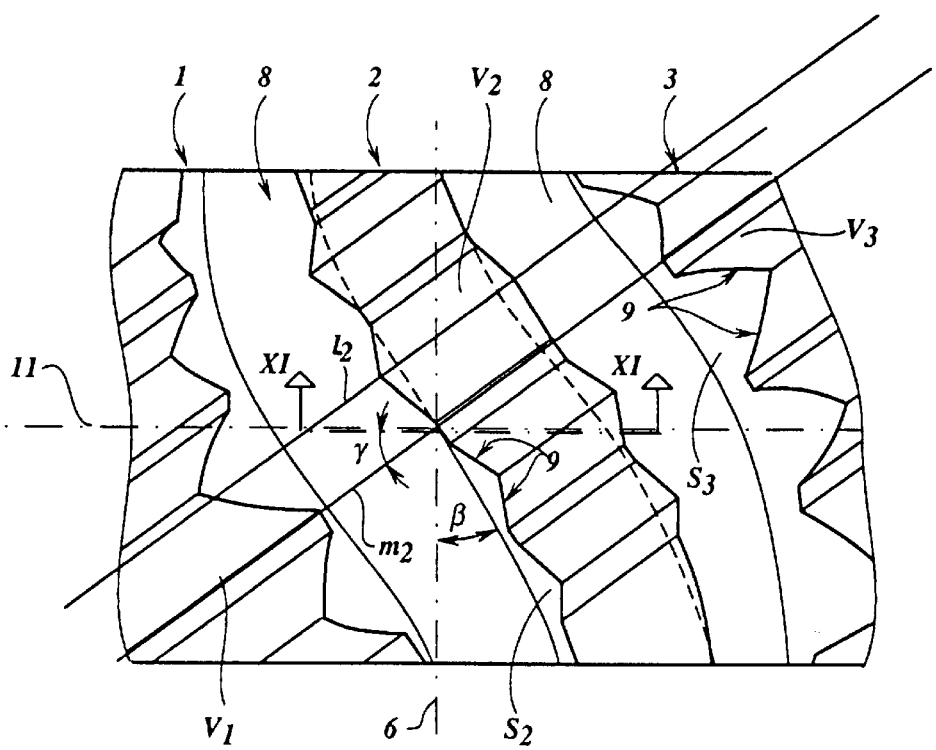
FIG. 10 shows a view, corresponding to FIG. 2, of a hob cutter according to the invention, having a helical cutting face.

FIG. 10 shows the view of a hob cutter which corresponds to FIG. 2 and in which the cutting face S is designed as a helical surface, the radius vector from the axis of rotation 6 to the cutting edge 9 always being situated in the cutting face S. Such helical cutting faces S are known and can optionally also be designed so that the cutting face S is formed by lines which cross the axis of rotation 6 perpendicularly at a constant spacing instead of intersecting it. The slope angle β is identical for all the positions of the cutting face, as a result of which the cutting properties of the hob cutter also improve.

Figure 11:
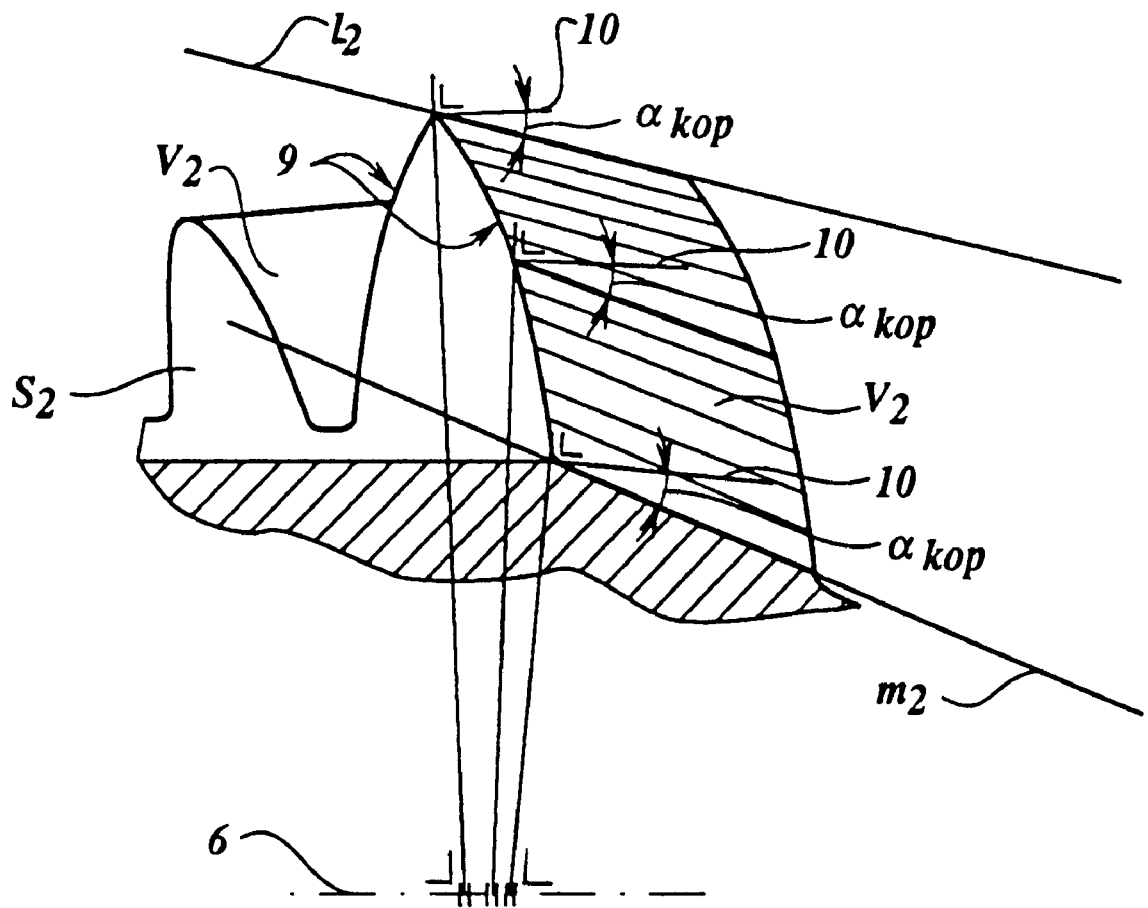
FIG. 11 shows a view along the line XI—XI in FIG. 9 or 10.

FIG. 11 shows a portion of a hob teeth group corresponding to the section along the line XI—XI in FIGS. 9 and 10. This figure shows the embodiment in which the clearance angle $α_{kop}$ is kept constant over the different diameters of the cutter. As a result, the generatrices no longer always run in the same direction. As a result of rotating the hob cutter during the machining, it is nevertheless possible for the generatrices always to occupy one and the same position with respect to the axis of rotation 6, which contributes to the simplicity of making the hob cutter and the costs thereof.

I claim:

1. A method for manufacturing a hob cutter for machining face gears, said hob cutter comprising a disk like cutter body having an axis of rotation and a plurality of hob teeth groups, said hob teeth groups having a front and a back, said hob teeth groups being distributed uniformly over the circumference of said cutter body and having at the front a cutting face, said method comprising the step of providing the teeth of the hob teeth groups with clearance faces, each said clearance face intersecting a cutting face of a said hob teeth group thereby forming a cutting edge, wherein said clearance face is machined with a machining tool along a line lying in a first flat plane, said first flat plane containing a second line which intersects or crosses said axis of rotation of said cutter body perpendicularly and intersects said cutting edge, said first flat plane making a lead angle (γ) with a second plane perpendicular to said axis of rotation, and wherein during machining of a said hob teeth group the machining tool is moved in a preprogrammed manner.

2. The method of claim 1, wherein during machining, said cutter body is rotated around its axis of rotation.

3. The method of claim 1, wherein said machining of said clearance face is formed by spark-erosion metal removal by means of a wire of a wire spark-erosion installation.

4. The method of claim 1, wherein said machining of said clearance face is formed by grinding by means of an abrasive wheel which makes an oscillating rectilinear movement with respect to said cutter body.

5. The method of claim 1, wherein said machining of said clearance face is formed by grinding by means of an abrasive wheel being in contact with the full length of the second line.

* * * * *